(No Model.)
B. GILMORE.
DEVICE FOR SEPARATING GAS AND WATER FROM OIL.
No. 554,598. Patented Feb. 11, 1896.
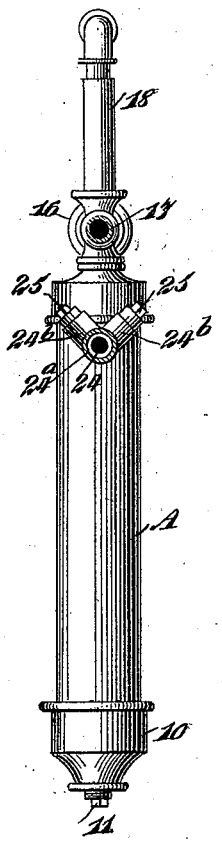
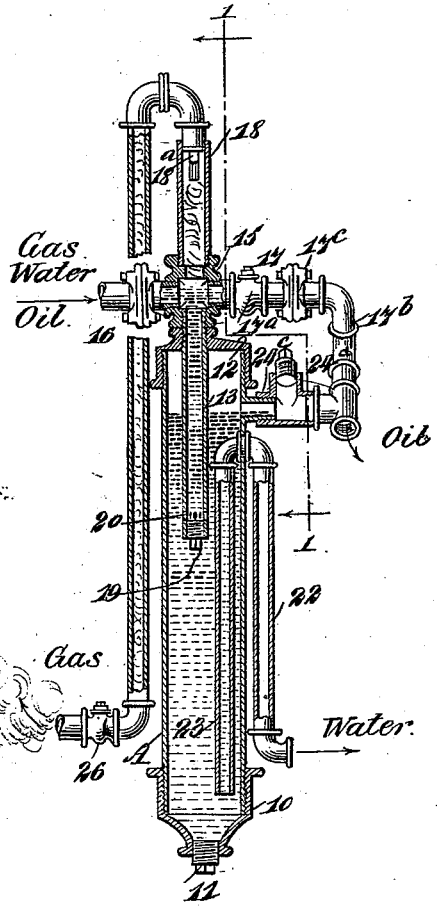

UNITED STATES PATENT OFFICE.

BENTON GILMORE, OF DEERFIELD, ASSIGNOR TO LORENZO D. PATTERSON, OF TIDIOUTE, AND FRANK A. WOOD AND MANLEY W. BOVEE, OF GRAND VALLEY, PENNSYLVANIA.

DEVICE FOR SEPARATING GAS AND WATER FROM OIL.

SPECIFICATION forming part of Letters Patent No. 554,598, dated February 11, 1896.

Application filed August 17, 1895. Serial No. 559,660. (No model.)

*To all whom it may concern:*

Be it known that I, BENTON GILMORE, of Deerfield township, in the county of Warren and State of Pennsylvania, have invented a new and Improved Device for Separating Gas and Water from Oil, of which the following is a full, clear, and exact description.

My invention relates to an improvement in devices for separating water and gas from oil, the object of the said invention being to provide an efficient means whereby the gas and water may be separated from the oil after the same has issued from a well and before it has reached a tank, thereby saving the expense of small tanks and also preventing a large share of the evaporation of oil in warm weather and slush in cold weather and also saving the expense and labor for steam.

Another object of the invention is to provide a device whereby any quantity of water can be separated from any quantity of oil and whereby also a separation of water and refined oil may be obtained.

Another object of the invention is to provide a means whereby one man can care for more wells at the same time than has heretofore been possible.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1 is a partial side elevation of the device and a partial vertical section, the section being on the line 1 1 of Fig. 2; and Fig. 2 is a longitudinal vertical section through the device.

In carrying out the invention the body A of the device is preferably a hollow cylinder, and ordinarily the lower end of the cylindrical body is provided with a reducing-cap 10, ordinarily closed by a plug 11, whereby any sediment in the body may be readily removed. The upper end of the cylindrical body is also closed by a reducing-cap 12, and through the upper reducing-cap a tube 13 is passed downward into the cylinder, the connection between the tube 13 and the upper reducing-cap of the cylinder being proof against oil, gas, and water.

Preferably a four-way fitting forming a confluent chamber 15 is screwed or otherwise secured upon the outer end of the pipe 13 introduced into the cylinder, one arm of the fitting receiving the said pipe, another arm being connected by a pipe 16 with the well supplying the oil, and the third arm being connected with a pipe 17, extending in an opposite direction to the feed-pipe 16, and the said pipe 17 is provided with a check-valve 17$^a$ and is connected by a union 17$^c$ or its equivalent with a branch 17$^b$, which is carried in a downwardly direction, and the said branch pipe 17$^b$ is preferably made up of fittings, so that it may be given more or less of an inclination, as occasion may demand, while the upper arm of the fitting is connected with another pipe 18, which latter pipe is curved at its upper end and made to extend downward at one side of the cylindrical body, preferably at that side at which the feed-pipe is located, from whence it is led wherever it is desired to deliver or discharge the gas entering the device with the oil and water. In fact the pipe 18 is a gas-delivery pipe.

The mixed gas, water and oil enters the device through the feed-pipe 16. A reducing-nipple 18$^a$ is located in the upper section of the gas-delivery pipe, extending downward within the section, which is attached to the confluent chamber or fitting 15, and the space below the reducing-nipple may be properly termed a "gas-chamber," and by reducing the upper end of this chamber in the event of a heavy flow of oil the oil is prevented from escaping into the gas-line, since the chamber is always filled with gas, and when a heavy flow of oil arrives it cannot crowd any higher than the aforesaid reducing-nipple.

The pipe 13 which is projected downward from the fitting 15 into the cylindrical body may be termed a "separating-pipe," and it is closed at its lower end by a plug 19 or the equivalent thereof, and adjacent to this plug apertures 20 are made in the said separating-pipe. Without the aid of this separating-pipe the gas could not be separated from the oil and water in so small a space. The plug 19 is used to prevent a downward flow and brings the fluid on a level, causing the separation to take place at once. The perforations in the said separating-pipe are below the oil-outlet, and therefore prevent the water escaping with the oil.

Near the upper end of the body A of the device and preferably at the side opposite that at which the gas-delivery pipe is located a water-exit 22 is placed, and this pipe may be connected with a tank or with any other proper receptacle for the water, such connection being made at its outer end, while its inner end, which extends within the cylindrical body, is connected with a stand-pipe 23, which extends downward to a low point in the said cylinder. The stand-pipe can be used outside of the machine by connecting it at the plug 11.

An oil-outlet is connected with or secured to the cylindrical body above the water-outlet 22. As shown in the drawings, the oil-outlet is in the nature of a four-way fitting and comprises a main arm $24^a$, which is connected with the branch $17^b$ of the valved pipe 17, two arms $24^b$ at angles to each other and to the main arm, as shown in Fig. 1, and a rear arm, $24^c$, secured upon the collar formed on the cylinder. The angular arms $24^b$ extend upward and outward in opposite directions, and each is ordinarily closed by a plug 25, and when the plug is removed a person is enabled to observe the flow of the oil through the outlet or main arm $24^a$.

The valved pipe 17 may be omitted, if desired, but is preferably retained, since by opening the valve $17^a$ the distributing capacity of the oil from wells that flow oil alone is comparatively doubled without enlarging the machine. The pipe 17 is not employed when the well flows water as well as oil.

In operation the gas, water and oil as received from the well, the check-valve $17^a$ being closed, will enter the fitting 15. The gas contained in the mixture will pass off from the fitting into and through the gas-outlet pipe 18, while the water and oil will pass together into the separating chamber or tube 13 and out through the apertures 20 therein. The water being heaviest will flow down into the bottom of the cylinder, while the oil will float on the top of the water and will pass off through the outlet 24, and the water will pass out through the outlet 22, being drawn from the bottom of the cylinder through the medium of the stand-pipe 23. Thus oil is prevented from escaping with the water as well as the water passing out with the oil.

The fitting 24 forming the outlet for the oil may be a T-fitting, if desired, with a hole formed in the plug in order to prevent suction on the line; and a check-valve 26 may be and preferably is used on the gas-delivery pipe, especially if there is any pressure on the line. The supply-pipe 16 is connected to the separator preferably by a union, as shown in Fig. 2, and by connecting the nipple and L-fitting to the water-outlet the water may be conducted in any desired direction from the derrick.

Instead of the reducer 10 at the bottom of the cylinder A a plug or a cap may be employed to close the same.

The device is made preferably entirely of metal, and will not therefore be destroyed in the event of fire, and operations may be resumed at once after the fire is extinguished.

Having thus described my invention, I claim as new and desire to secure by Letters Patent—

1. In a device for separating gas and water from oil, a main chamber provided with an outlet for oil and an outlet for water, a separating-tube entering the said chamber and provided with openings near its lower end, the openings in the separating-tube being below the outlets for the water and for the oil, the separating-tube being adapted to receive oil and water, conducting them into the said chamber, a connection between the separating-tube and the source of oil-supply, and a gas-offtake pipe connected with the oil-supply immediately above its entrance into the separating-tube, the said gas-offtake pipe being provided with a gas-receiving chamber immediately over the source of oil-supply, and a section entering the said chamber, and provided with a reduced nipple, as and for the purpose specified.

2. In a device for separating gas and water from oil, a main chamber provided with an outlet for oil and an outlet for water, a separating-tube entering the said chamber and provided with apertures at its lower end, the apertured portion of the tube being below the line of the oil and water outlets, a connection between the separating-tube and a source of oil-supply, and a valved pipe adapted to receive the oil-supply direct, being in communication with the separating-tube and with the oil-outlet, and a gas-offtake pipe also connected with the source of oil-supply above its connection with the separating-tube, as and for the purpose set forth.

3. In an apparatus substantially as described, the combination of a main chamber, a supply tube or pipe by which oil and water may be delivered into said chamber and an oil-discharge pipe having a connection with the chamber and also a connection with the supply in advance of its delivery to the chamber, substantially as set forth.

4. In an apparatus substantially as described, the combination of a main chamber, the supply pipe or tube delivering oil and water into said chamber, an oil-discharge having a direct connection with the chamber and a branch connection with the supply in advance of such chamber and a valve controlling such branch connection, substantially as set forth.

5. In an apparatus substantially as described, the combination of the main chamber, a confluent chamber or fitting a separating-tube connected with said chamber and leading to the main chamber, the oil-supply and gas-discharging pipes connected with said confluent chamber and an oil-discharging pipe connected with the confluent chamber, substantially as and for the purposes set forth.

6. In an apparatus substantially as described, the combination of the main chamber, a confluent chamber or fitting above said main chamber an oil-supply leading to said confluent chamber, a separating-tube connected with the latter and extended into the main chamber, a gas-chamber connected with the confluent chamber and having a gas-offtake and an oil-discharge also connected with the confluent chamber, substantially as set forth.

7. In an apparatus substantially as described, the combination with the separating-chamber and the oil-supply connected therewith, of a gas-chamber connected with the supply in advance of the separating-chamber and leading upward and reducing means within said gas-chamber, and the oil-discharge also connected with said gas-chamber substantially as set forth.

8. An apparatus substantially as described comprising the chamber, the supply-pipe the oil-exit pipe having branches at an angle, and plugs for normally closing said branches, and the gas and water discharges, substantially as set forth.

BENTON GILMORE.

Witnesses:
J. H. WEST,
WILLISTON P. WOOD.